(12) United States Patent
Luo et al.

(10) Patent No.: US 10,407,796 B2
(45) Date of Patent: Sep. 10, 2019

(54) METAL LAMINATE STRUCTURES WITH SYSTEMS AND METHODS FOR TREATING

(71) Applicant: General Electric Company, Schenectady, NY (US)

(72) Inventors: Yuefeng Luo, Mechanicville, NY (US); William Edward Adis, Scotia, NY (US); Michael Lewis Jones, Scotia, NY (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/185,434

(22) Filed: Jun. 17, 2016

(65) Prior Publication Data
US 2016/0298258 A1 Oct. 13, 2016

Related U.S. Application Data

(62) Division of application No. 14/062,341, filed on Oct. 24, 2013, now Pat. No. 9,393,759.

(51) Int. Cl.
*C25F 3/24* (2006.01)
*B32B 15/04* (2006.01)
(Continued)

(52) U.S. Cl.
CPC .............. *C25F 3/24* (2013.01); *B32B 3/00* (2013.01); *B32B 3/02* (2013.01); *B32B 3/30* (2013.01);
(Continued)

(58) Field of Classification Search
CPC ......... C25D 7/06–7/0664; C25D 11/36; C25F 1/06; C25F 3/24
See application file for complete search history.

(56) References Cited

U.S. PATENT DOCUMENTS 2,590,927 A  4/1952  Brandt et al.
3,957,452 A * 5/1976  Schaer ............... C25D 5/44
                                                    428/650
(Continued)

FOREIGN PATENT DOCUMENTS

EP   0756297 B1   11/2000
GB   1090743 A  * 11/1967  ............ C25D 11/36

OTHER PUBLICATIONS

Notice of Allowance and Fee(s) Due dated Mar. 2, 2018 for U.S. Appl. No. 14/797,700 filed Oct. 13, 2013; pp. 4.
(Continued)

*Primary Examiner* — Nicholas A Smith
(74) *Attorney, Agent, or Firm* — Dale Davis; Hoffman Warnick LLC

(57) ABSTRACT

The present disclosure generally relates to a sealed metal laminate structure comprising: a metal layer having a first surface and an opposite second surface; a first enamel layer laminated on the first surface of the metal layer, except at an exposed metal protrusion at a perimeter edge of the sealed metal laminate structure; a second enamel layer laminated on the second surface of the metal layer, except at the exposed metal protrusion at the perimeter edge of the sealed laminate structure; and a phosphate sealer deposited on the exposed metal protrusion of the sealed metal laminate structure. The present disclosure also relates to a metal laminate structure without a phosphate sealer. In addition, systems and methods for treating workpieces, including metal laminate structures, are discussed.

19 Claims, 11 Drawing Sheets

(51) Int. Cl.

| | | |
|---|---|---|
| *B32B 7/00* | (2019.01) | |
| *B32B 7/12* | (2006.01) | |
| *B32B 9/00* | (2006.01) | |
| *B32B 9/04* | (2006.01) | |
| *B32B 15/00* | (2006.01) | |
| *B32B 3/00* | (2006.01) | |
| *B32B 3/02* | (2006.01) | |
| *B32B 3/30* | (2006.01) | |
| *C25F 1/06* | (2006.01) | |
| *C25F 7/00* | (2006.01) | |
| *C25D 9/06* | (2006.01) | |
| *C25D 9/10* | (2006.01) | |
| *C25D 11/36* | (2006.01) | |

(52) U.S. Cl.
CPC ............... *B32B 7/00* (2013.01); *B32B 7/12* (2013.01); *B32B 9/00* (2013.01); *B32B 9/04* (2013.01); *B32B 15/00* (2013.01); *B32B 15/04* (2013.01); *C25D 9/06* (2013.01); *C25D 9/10* (2013.01); *C25D 11/36* (2013.01); *C25F 1/06* (2013.01); *C25F 7/00* (2013.01); *B32B 2255/00* (2013.01); *B32B 2255/06* (2013.01); *B32B 2264/104* (2013.01); *B32B 2307/20* (2013.01); *B32B 2307/208* (2013.01); *B32B 2307/7242* (2013.01); *B32B 2307/7265* (2013.01); *B32B 2457/00* (2013.01); *Y10T 428/31678* (2015.04)

(56) References Cited

U.S. PATENT DOCUMENTS

| | | | | |
|---|---|---|---|---|
| 4,039,398 A * | 8/1977 | Furuya | ............ | C25D 5/02 204/206 |
| 4,326,933 A * | 4/1982 | Sabatka | ............ | C25F 7/00 204/206 |
| 4,486,279 A * | 12/1984 | Fromson | ............ | B23H 9/02 204/212 |
| 5,015,340 A * | 5/1991 | Colombier | ............ | C25D 5/36 205/138 |
| 5,335,681 A * | 8/1994 | Schmid | ............ | C23F 1/08 134/64 R |
| 5,571,389 A * | 11/1996 | Kerampran | ............ | C25D 5/06 204/224 R |
| 5,804,053 A * | 9/1998 | Vaccaro | ............ | C25D 5/54 204/206 |
| 6,235,180 B1 * | 5/2001 | Kobayashi | ............ | C25D 11/36 204/206 |
| 6,471,848 B1 * | 10/2002 | Arao | ............ | C23C 8/40 205/138 |
| 6,979,391 B1 * | 12/2005 | Hubel | ............ | C25D 7/0614 204/198 |
| 9,393,759 B2 | 7/2016 | Luo et al. | | |
| 2002/0168551 A1 * | 11/2002 | Emmonds | ............ | B05D 7/544 428/697 |
| 2007/0295608 A1 * | 12/2007 | Hackenberg | ............ | C25D 3/565 205/318 |
| 2011/0147221 A1 * | 6/2011 | Nishiwaki | ............ | C25D 7/0621 205/138 |
| 2011/0174635 A1 * | 7/2011 | Hotta | ............ | B41N 3/034 205/658 |

OTHER PUBLICATIONS

Sastri. Office Action Communication for U.S. Appl. No. 14/797,700. dated Nov. 1, 2017, 17 pages.

* cited by examiner

METAL LAMINATE STRUCTURES WITH SYSTEMS AND METHODS FOR TREATING

FIELD OF THE INVENTION

The present disclosure generally relates to metal laminate structures, such as those used in stator cores. In addition, the present disclosure relates to systems and methods for treating workpieces such as metal laminate structures.

BACKGROUND OF THE INVENTION

Electrical generators may be used in power plants, cogeneration plants, vehicles, or other implementations for converting mechanical energy into electrical energy. These electrical generators may contain thin sheets of metal, generally called metal laminate structures or "laminations." Each laminate structure can be stacked to a generator core. A generator core with accompanying laminate structures can be used to create magnetic conductance for power generation. Laminations can also reduce parasitic eddy currents within the generator core. Laminations may serve other purposes as well, such as being thermal conductors and structural supports.

Generally, laminations are cut or stamped from a larger metal sheet of a thin metal coated with "mill coating layers." Mill coating layers may be composed of ceramic and polymer materials, and are generally provided by a manufacturer of the metal sheet. The mill coating layers can electrically insulate adjacent laminations from each other. Cutting or stamping a lamination from the metal sheet may cause excess metal "burrs" to form along the cut edges of each lamination. The cutting or stamping processes can also damage the mill coating layers, most commonly along the edge of a lamination. Burrs and coating damages are defects which can reduce insulation in the core of a generator.

Typically, any burrs along the edge of a lamination can be removed through additional processes. For example, burrs can be removed from a combination of sanding and grinding. In situations where the metal sheet and its mill coating are especially thin, the risk of damage from deburring can increase. In particular, conventional deburring processes may further damage or even remove the mill coating layers on the lamination. As a result, the laminations may require recoating.

SUMMARY OF THE INVENTION

A first aspect of the invention includes a sealed metal laminate structure comprising: a metal layer having a first surface and an opposite second surface; a first enamel layer laminated on the first surface of the metal layer, except at an exposed metal protrusion at a perimeter edge of the sealed metal laminate structure; a second enamel layer laminated on the second surface of the metal layer, except at the exposed metal protrusion at the perimeter edge of the sealed laminate structure; and a phosphate sealer deposited on the exposed metal protrusion of the sealed metal laminate structure.

A second aspect of the invention includes a metal laminate structure comprising: a metal layer having a first surface and an opposite second surface, wherein the metal layer is punched from one of a metal sheet and a metal coil; a first mill coating layer laminated on the first surface of the metal layer, except at an exposed portion of the metal layer at a perimeter edge of the metal laminate structure, wherein the first mill coating layer has a substantially uniform first thickness; a second mill coating layer laminated on the second surface of the metal layer, except at the exposed portion of the metal layer at the perimeter edge of the metal laminate structure, wherein the second mill coating layer has a substantially uniform second thickness; a first enamel layer laminated on the first mill coating layer, except at an exposed portion of the first mill coating layer at the perimeter edge of the metal laminate structure; and a second enamel layer laminated on the second mill coating layer, except at an exposed portion of the second mill coating layer at the perimeter edge of the metal laminate structure.

A third aspect of the invention includes a system for treating a workpiece, the system comprising: a first electrolyte bath having a first electrode thereon; a second electrolyte bath having a second electrode thereon, wherein the second electrode has an opposite polarity from the first electrode; a power supply coupled to the first electrode and the second electrode; and a barrier seal dividing the first electrode bath from the second electrode bath, wherein the barrier seal comprises a passage configured to: allow the workpiece to move from one of the first electrolyte bath and the second electrolyte bath to the other electrolyte bath, while preventing electrical shorting between each one of the first electrolyte bath and the second electrolyte bath.

A fourth aspect of the invention includes a method for treating a workpiece, the method comprising: providing at least two electrolyte baths having opposite polarity, each in physical contact with at least two corresponding electrodes, wherein a barrier seal divides the at least two electrolyte baths from each other; and directing the workpiece to pass through each of the two electrolytic baths to remove burrs from the surface of the workpiece.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure relates to both sealed and unsealed metal laminate structures. In addition, the present disclosure includes systems and methods for making and treating both sealed and unsealed metal laminate structures.

Figure 1:
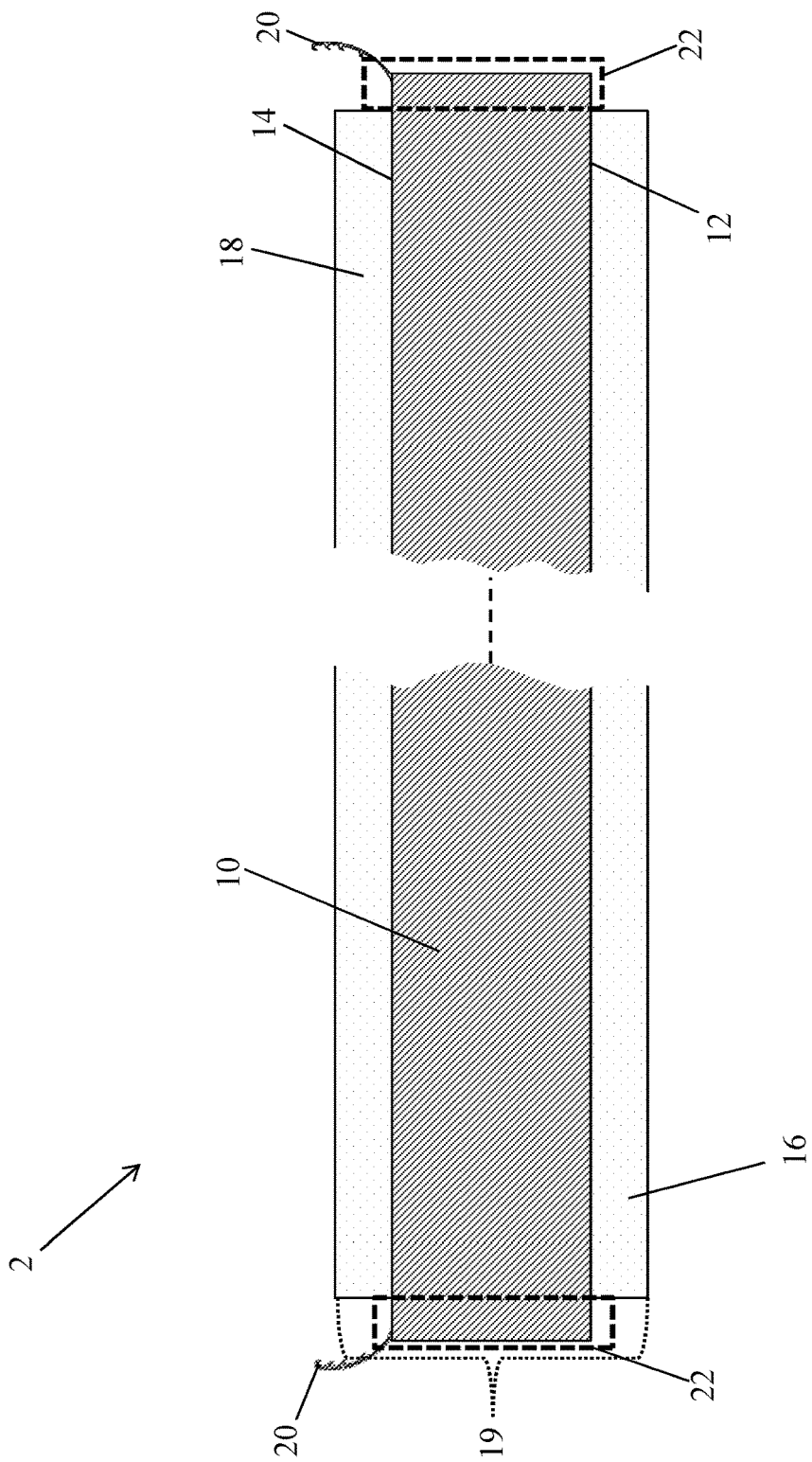
FIG. 1 shows a cross-sectional view of a conventional metal laminate structure with chipping areas and burrs.

Turning to FIG. 1, a metal laminate structure 2 created according to a conventional process is shown. As demonstrated by the cutoff region of FIG. 1, metal layer 10 and its accompanying components may have any desired length. Metal laminate structure 2 can include a metal layer 10. Metal layer 10 may punched from a larger metal sheet or coil provided by a manufacturer. Equipment for punching metal layer 10 from a sheet or coil can include, for example, a punching die. Metal layer 10 can have a substantially rectangular cross section, including a first side 12 and a second side 14. Metal layer 10, before being punched, can include a first mill coating layer 16 in contact with first side 12. Similarly, a second mill coating layer 18 can be in contact with second side 14 of metal layer 10.

As is known in the art, mill coating layers 16, 18 can be a manufacturer-applied material, such as a ceramic and/or polymer material. Mill coating layers 16, 18 can have pre-defined properties of material strength and electrical resistance. Mill coating layers 16, 18, can be continuous layers extending from one perimeter edge 19 (denoted by corresponding phantom line) of metal layer 10 to another. Mill coating layers 16, 18, when provided, can have a substantially uniform thickness before undergoing conventional treatments. Conventional treatments may later damage or remove mill coating layers 16, 18 as described herein.

In a conventional lamination process, metal layer 10 and mill coating layers 16, 18 can be punched to form a laminated metal structure, also referred to as a "lamination." As an example, metal layer 10 can be sold in the form of a rolled coil (not shown). A customer can unroll metal layer 10 into a flat sheet. The customer can punch metal layer 10 with a tool known in the art, such as a punching die (not shown). Through punching, the customer can create metal laminations or workpieces having a desired shape or size.

Conventional punching can cause excess metal in the form of burrs 20 to appear at points where metal layer 10 separates from a factory sheet or coil. In addition, chipping areas 22 may be present along perimeter edge 19 of metal layer 10 where the lamination or workpiece was cut. Chipping areas 22 can cause insulation failure of metal structure 2 along perimeter edge 19. This bare and conductive edge can impair the use of metal structure 2 in a generator core with other stacked metal structures. Thus, the formation of burrs 20 and chipping areas 22 in conventional processes is a quality loss associated with conventional punching.

Figure 2:
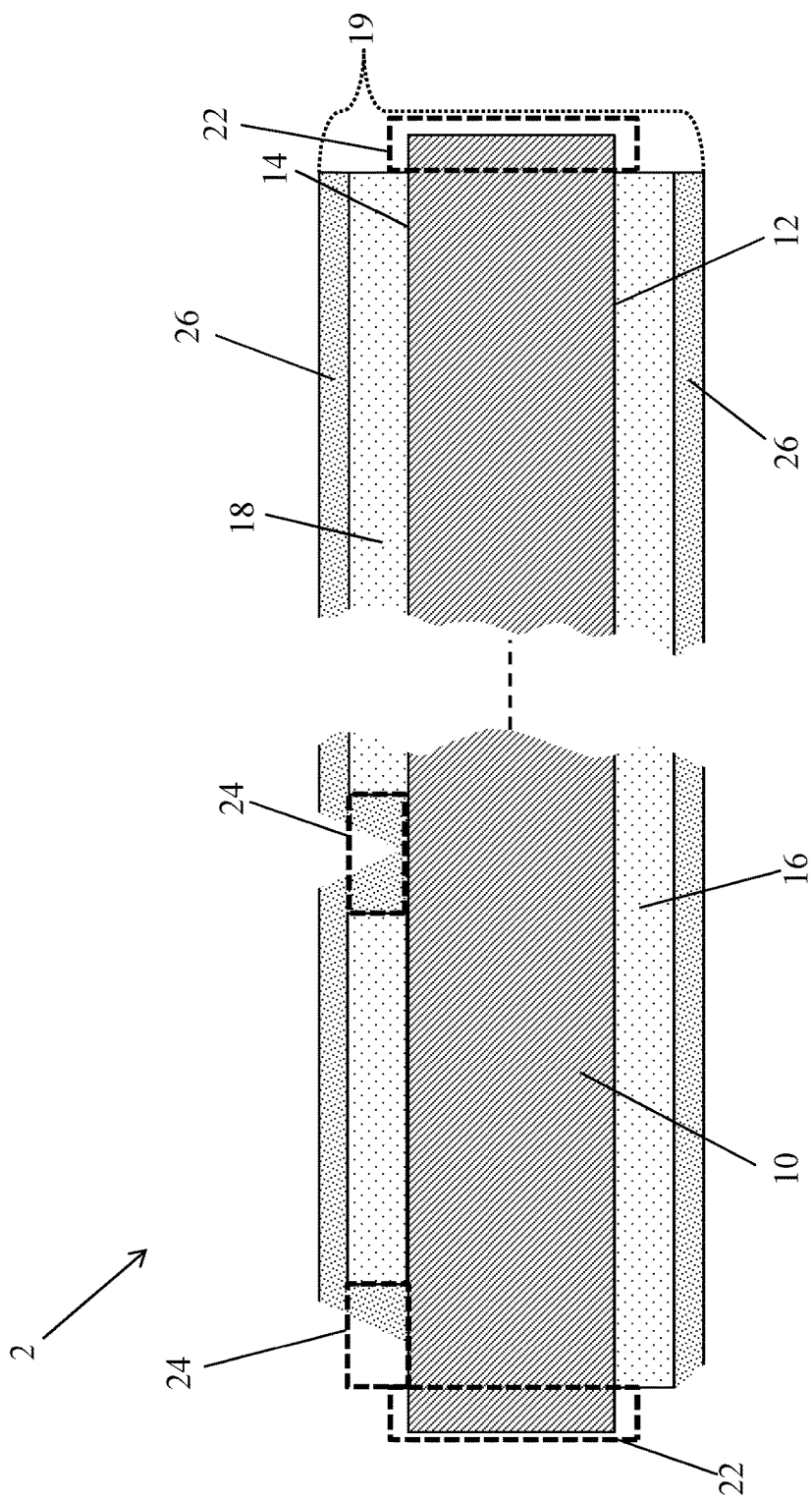
FIG. 2 shows a cross-sectional view of a conventional metal laminate structure with chipping areas, recoat layers, and damaged mill coating layers.

A conventional sanding process can remove burrs 20 (FIG. 1) but also damage mill coating layers 16, 18. As shown in FIG. 2, damage can take the form of gaps 24 (shown in phantom). Gaps 24 can represent portions of mill coating layers 16, 18 that were removed from being in contact with sanding and grinding equipment. Gaps 24 can be present on first side 12 and/or second side 14 of metal layer 10.

One technique for restoring quality to metal layer 10 in a conventional process is to recoat mill coating layers 16, 18. Mill coating layers 16, 18 can be recoated with a recoat layer 26. Recoat layer 26 can be an electrically insulating layer of organic-based materials with inorganic fillers. Recoat layer 26 can include peaks, valleys, etc., based on the presence of gaps 24 in mill coating layers 16, 18. Despite the presence of recoat layer 26, electrical insulation at gaps 24 can still be weak relative to the remaining portions of metal layer 10 as a result of damage to mill coating layers 16, 18 and/or contamination from sanding.

Conventional sanding and recoating may cause other quality losses. One quality loss is that chipping areas 22 are not removed or covered by insulation, and chipping areas 22 may even expand upon sanding. Another quality loss is that gaps 24 can remain present in mill coating layers 16, 18 after recoating. In addition, the time and costs of applying recoat layer 26 can make manufacturing less efficient.

Figure 3:
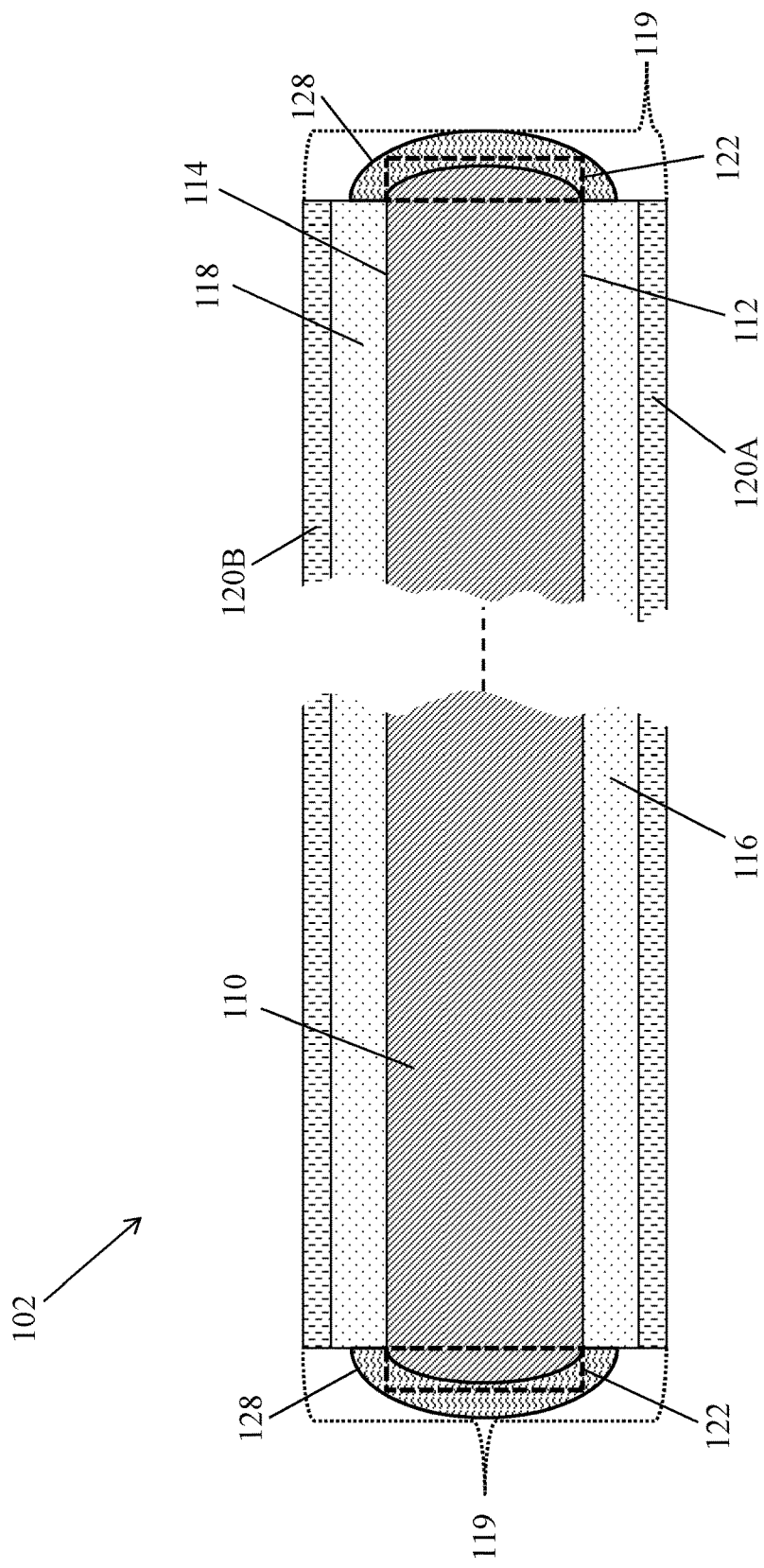
FIG. 3 shows a cross-sectional view of a sealed metal laminate structure according to an embodiment of the disclosure.

Turning to FIG. 3, an example of a sealed lamination structure 102 according to an embodiment of the present disclosure is shown. As demonstrated by the cutoff region of FIG. 3, sealed lamination structure 102 and its accompanying components may have any desired length. In an embodiment, sealed lamination structure 102 can include metal layer 110 with a first surface 112 and a second surface 114. Metal layer 110 can be made from any desired type of metal or steel, e.g., electrical steels such as silicon steel. One or more mill coating layers 116, 118 can be in contact with each of the first and second surfaces 112, 114 of metal layer 110. As described elsewhere herein, mill coating layers 116, 118 can be composed of ceramic and/or polymer materials.

Sealed lamination structure 102 can be coated with first and second enamel layers 120A, 120B. As an example, first enamel layer 120A can be in contact with first mill coating layer 116. Similarly, second enamel layer 120B can be in contact with second mill coating layer 118.

Enamel layers 120A, 120B can each independently be a single layer, as shown in FIG. 3, or can be in the form of multiple layers. Generally, the material of enamel layers 120A, 120B is an electrical insulation coating. Examples of materials that can make up enamel layers 120A, 120B can include, for example, "C-6" coating material typically used in electric steel applications. "C-6" coatings, as defined by the American Society for Testing and Materials (ASTM) can include organic-based insulative coatings (e.g., polymers) along with inorganic filler materials. Inorganic filler materials may enhance the electrical insulation properties of the coatings. Other coatings may include, for example, "C-3" coatings (also defined by ASTM), which are generally organic enamel or varnish coatings. Several electrically insulative coatings may be combined in enamel layers 120A, 120B to form a multilayer coating. These layers are applied as very thin layers to metal layer 10.

Enamel layers 120A, 120B can be applied through currently known or later developed methods for bonding organic coatings to a metal lamination. In some embodiments, enamel layers 120A, 120B can be coated on mill coating layers 116, 118 of a metal layer 110 that has not been punched from a factory coil or sheet, as described elsewhere herein. In other circumstances, enamel coatings 120A, 120B can be applied after punching. Enamel layers 120A, 120B can protect metal layer 110 and/or mill coating layers 116, 118 from some forms of damage, such as corrosion and damage associated with punching.

The thickness of enamel layers 120A, 120B can vary based on preference. In some embodiments, enamel layers 120A, 120B can extend between approximately 1.2 micrometers and approximately 7.6 micrometers away from mill coating layers 116, 118. In other embodiments, the thickness of enamel layers 120A, 120B can be approximately 3.3 micrometers.

The electrical resistance of enamel layers 120A, 120B may be proportionate to their thickness. The materials used in enamel layers 120A, 120B may also affect their electrical resistance. As described elsewhere herein, enamel layers 120A, 120B may be an electrically insulative coating that includes polymers. Polymers may offer less electrical resistance than ceramic-based materials generally used in mill coating layers 116, 118.

Punching of metal layer 110 from a factory coil or sheet can create chipping areas 122 at the perimeter edges 119 of sealed lamination structure 102. Chipping areas 112 can be substantially perpendicular to first and second mill coatings 116, 118 and/or enamel layers 120A, 120B.

Metal layer 110 can be punched from a factory coil or sheet upon which enamel layers 120A, 120B are present. As described elsewhere herein, chipping areas 122 may appear on metal layer 110 in response to punching. In some cases, chipping areas 122 may protrude beyond perimeter edges 119 of first and second mill coating layers 116, 118 and/or enamel layers 120A, 120B. In an embodiment, sealers 128, such as phosphate sealers, can be formed on chipping areas 122 or any similar metal protrusions exposed from metal layer 10.

Sealers 128 can be affixed to chipping areas 122 through electrolytic conversion or electrolytic deposition in an electrolytic bath, as described elsewhere herein. Sealer 128 can be composed of a phosphate compound, such as iron phosphate or zinc phosphate. In addition, sealer 128 can be deposited during the same process (e.g., electrolytic conversion or deposition), or within the same system, used to remove burrs 20 (FIG. 1) from metal layer 110. Embodiments of systems and processes for removing burrs 20 (FIG. 1) and applying sealer 128 are discussed in further detail elsewhere herein.

Sealed laminated structure 102 offers several improvements to quality. Without the use of sanding or grinding, first and second mill coating layers 116, 118 can remain undamaged. As a result, first and second mill coating layers 116, 118 of sealed laminated structure 102 can have a substantially uniform thickness without gaps 24 (FIG. 2). In this manner, first and second mill coating layers may extend from one perimeter edge 119 of sealed laminated structure 102 to another. Further, the first and second enamel layers 120A, 120B can reduce damage to first and second mill coating layers 116, 118 during punching of sealed laminated structure 102 from a metal sheet.

Enamel layers 120A, 120B, can reduce the formation of burrs 20 (FIG. 1) during punching because organic materials in enamel layers 120A, 120B may offer a lubricating effect. Specifically, enamel layers 120A, 120B can defend metal layer 110 against excess punching forces to prevent burrs 20 (FIG. 1). In cases where burrs 20 (FIG. 1) are present, they can be removed in systems and processes described elsewhere herein, without sanding or recoating. These processes allow mill coating layers 116, 118 of sealed laminated structure 102 to exhibit no damage from sanding or grinding.

Figure 4:
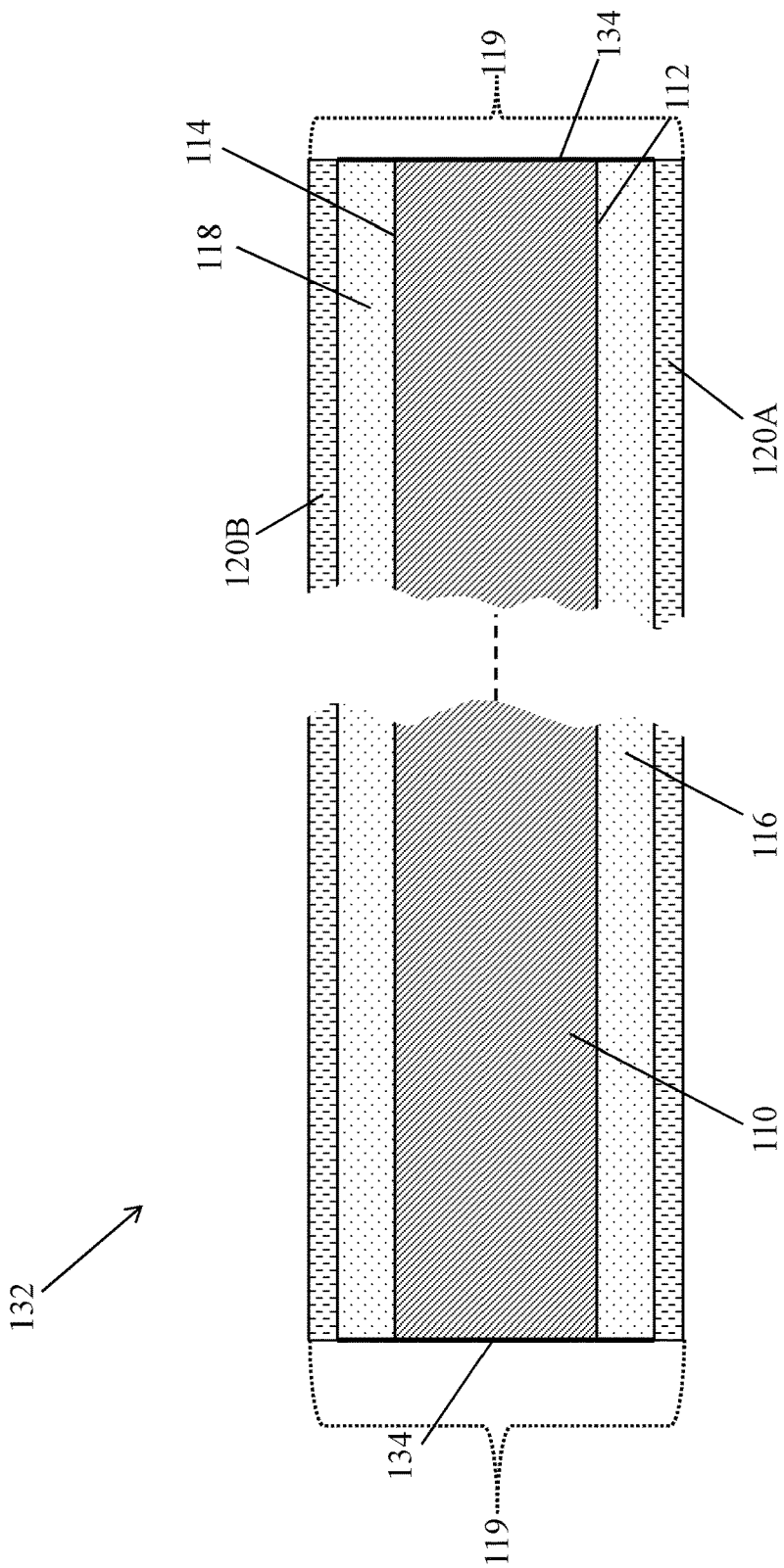
FIG. 4 shows a cross-sectional view of a metal laminate structure according to a further embodiment of the disclosure.

Turning to FIG. 4, a metal laminate structure 132 according to an embodiment of the invention is shown. As demonstrated by the cutoff region of FIG. 4, metal laminate structure 132 and its accompanying components may have any desired length. Metal laminate structure 132 can include metal layer 110 with first and second surfaces 112, 114. First and second mill coating layers 116, 118 can be bonded to each surface 112, 114 of metal layer 110.

Enamel layers 120A, 120B, can be laminated onto each mill coating layer 116, 118. Enamel layers 120A, 120B can be laminated onto an unpunched factory sheet or coil or metal according to currently known or later developed processes for laminating an enamel. Enamel layers 120A, 120B may be composed of one or more coating materials typically used in electric steel applications, such as C-6, as described elsewhere herein. Mill coating layers 116, 118 can be continuous layers of substantially uniform thickness, extending from one perimeter edge 119 of metal laminate structure 132 to another perimeter edge 119.

Enamel layers 120A, 120B of metal laminate structure 132 can each be laminated to mill coating layers 116, 118 as outermost layers of metal laminate structure 132. However, enamel layers 120A, 120B may be absent at an exposed portion 134 of metal layer 110. Exposed portion 134 can also include portions of mill coating layers 116, 118 along perimeter edge 119. In an embodiment, the surface of exposed portion 134 can be substantially flush with enamel layers 120A, 120B.

In metal laminate structure 132 of FIG. 4, chipping areas 122 (FIG. 3) and sealers 128 (FIG. 3) may be absent. Specifically, the exposed portion 134 can extend at most approximately 0.5 millimeters or at most approximately 0.3 millimeters from perimeter edge 119 of the metal laminated structure. In other embodiments, exposed portion 134 can be a recess within perimeter edge 119 of metal laminate structure 132. Treatments from systems and processes described elsewhere herein can allow metal laminate structure 132 to exhibit these features.

Figure 5:
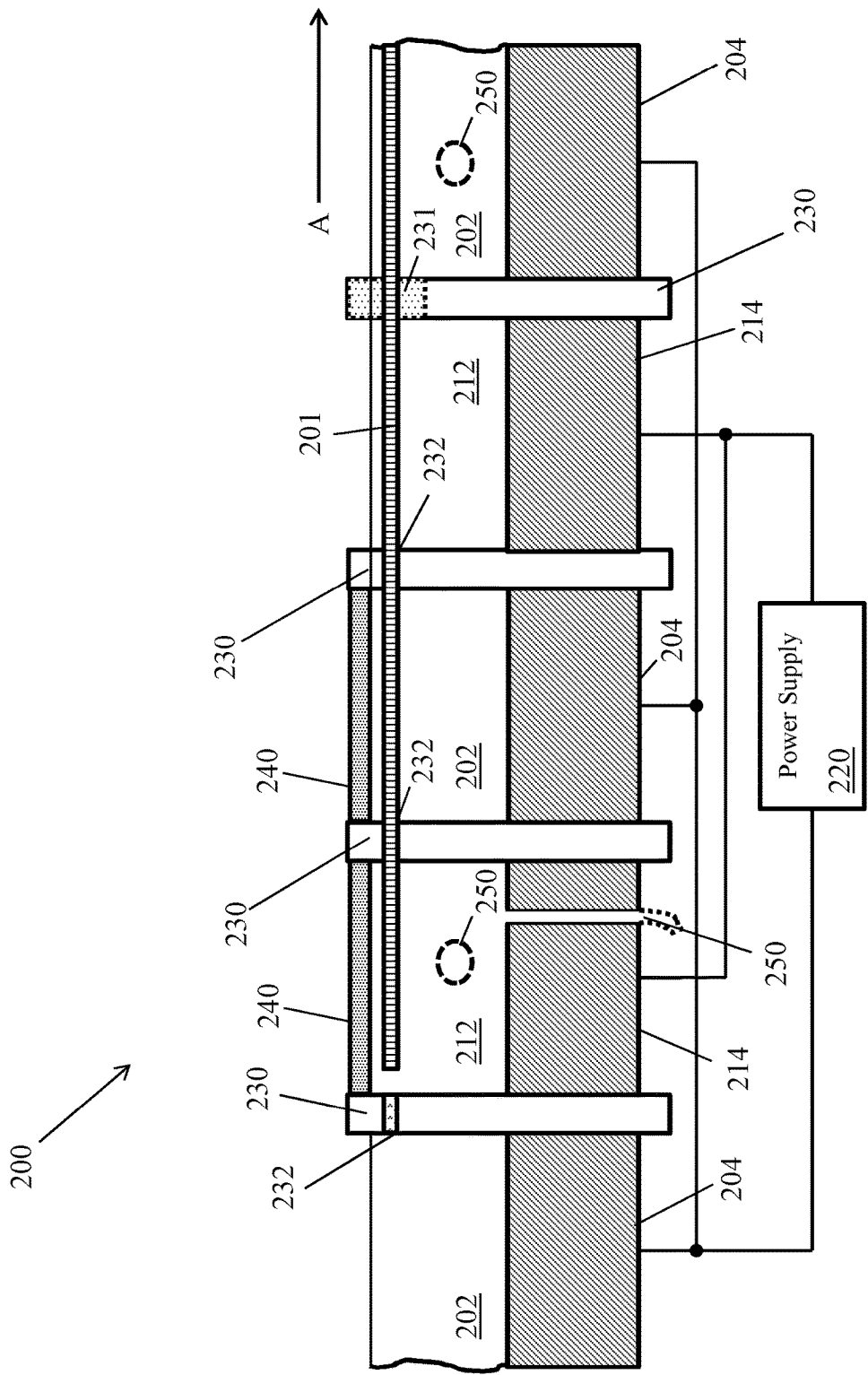
FIG. 5 shows a cross-sectional view of a system for treating a workpiece according to an embodiment of the disclosure.

Turning to FIG. 5, a system 200 for treating a workpiece 201 is shown. As used herein, the term "workpiece" can refer to metal sheets or lamina. The term "treating" or "treatment" can encompass several events, such as cleaning, sealing, and deburring. Workpiece 201 may have been previously punched from a larger metal sheet or coil, or may be an entire metal sheet or coil. System 200 can include a first electrolyte bath 202 in contact with a first electrode 204. First electrode 204 can be a surface of first electrolyte bath 202. In addition, system 200 can include a second electrolyte bath 212 in contact with a second electrode 214 located thereon. Second electrode 214 can have an opposite polarity from first electrode 204.

In some embodiments, system 200 can also include additional electrolyte baths 202, 212. Each electrolyte bath 202, 212 can contain aqueous electrolytes such as phosphoric acid, nitric acid, zinc oxide, sodium chloride, sodium nitrate, and/or other substances. If desired, each electrolyte bath 202, 212 can include the same electrolytes. Although FIG. 5 depicts system 200 with several electrolyte baths 202, 212, embodiments of system 200 can include only first electrolyte bath 202 and second electrolyte bath 212 if desired.

One or more power supplies 220 can be coupled to each of the first and second electrodes 204, 214. Power supply 220 can deliver an AC or DC voltage to each electrode 204, 214 and, by extension, each electrolyte bath 202, 212. In some embodiments, power supply 220 can supply DC voltages of opposite polarity to each electrolyte bath 202, 212. Power supply 220 can supply a voltage between approximately 10 V and approximately 60 V, whether positive or negative. Each first electrode 204 can have the same electrical potential and connect to the same terminal of power supply 220. Each second electrode 214 may the same magnitude of electrical potential as first electrode 204, but may be of opposite polarity from each first electrode 204 and may connect to another terminal of power supply 220.

System 200 can include one or more barrier seals 230. Barrier seal 230 can physically divide two or more electrolyte baths 202, 212 from each other. Each barrier seal 230 can stop electrolytic compounds from crossing between electrolyte baths 202, 212 and causing malfunctions such as electrical shorts. In addition, barrier seals 230 can electrically insulate each of the electrolyte baths 202, 212. An optional air space 231 (shown in phantom) can substitute for a section of barrier seal 230, and also separate electrolytes in each bath 202, 212 from each other in addition to barrier seal 230, which is solid. Electrolyte from each bath 202, 212 may enter air space 231 and flow outside of system 200.

Each barrier seal 230 can also include a passage 232. Passage 232 can be selectively permeable. In other words, passage 232 can stop electrolytic compounds from crossing between electrolyte baths 202, 212, while allowing other items (e.g., workpiece 201) to pass through barrier seals 230. Thus, passage 232 may allow workpiece 201 to move from first electrolyte bath 202 into second electrolyte bath 212 or vice versa. Passages 232 can also prevent electrical shorting between oppositely charged electrolyte baths 202, 212. To provide this feature, passage 232 can be in the form of air gap 231, a spring loaded tip, an elastic curtain, an elastic contact seal, and/or a pinch roller.

In some embodiments, system 200 can include one or more cover plates 240. Cover plates 240 can be coupled to barrier seals 230 and positioned above electrolyte baths 202, 212. As workpiece 201 passes through electrolyte paths 202, 212, aqueous electrolyte can be displaced. Cover plates 240 can prevent aqueous electrolyte in electrolyte baths 202, 212 from flowing over barrier seals 230. Cover plates 240 can also prevent workpiece 240 from deflecting under electrolyte pressure.

In another embodiment, electrolyte baths 202, 212 can include one or more electrolyte transmission apertures 250. Electrolyte transmission apertures 250 can provide a route such as a pipe, line, etc. through which aqueous electrolyte enters or leaves an electrolyte bath 202, 212. Some electrolyte transmission apertures 250 can remove reacted aqueous electrolyte from electrolyte baths 202, 212. Other electrolyte transmission apertures 250 can replenish unreacted aqueous electrolyte for electrolyte baths 202, 212. For example, pumps and routed piping (not shown) can cause electrolyte to be delivered to and removed from electrolyte baths 202, 212.

For example, in embodiments where cover plate 240 is not provided, aqueous electrolyte can enter electrolyte bath 202, 212 through electrolyte transmission aperture 250. Aqueous electrolyte in electrolyte bath 202, 212 can exit by flowing into another electrolyte transmission aperture 250 (shown in phantom), into air space 231, or over a dam (not shown) into or out of the plane of FIG. 5. In some cases, electrolyte transmission apertures 250 can also have a substantially horizontal orientation.

Processes by which system 200 can treat a workpiece 201 are disclosed. Treatments applied to workpiece 201 can include cleaning, sealing, and deburring via electrolytic processes. Though specific examples are provided herein, various treatments can be added, combined, or omitted as desired.

A first process can include zinc phosphate sealing, and deburring, of workpiece 201. Aqueous electrolyte in each electrolyte bath, 202, 212 can include phosphoric acid, nitric acid, and/or zinc oxide among other substances. The aqueous electrolyte in each electrolyte bath 202, 212 can be acidic with a pH of at most approximately 3.0. The separation between workpiece 201 and electrodes 204, 214 can range, for example, from approximately 2.5 millimeters to approximately 38.1 millimeters. As discussed elsewhere herein, the voltage of each bath in some embodiments can range from between approximately 10 V to approximately 60 V.

First electrodes 204 (each separated by respective second electrodes 214) can be a negatively charged "cathode," thereby causing each corresponding electrolyte bath 202, to be negatively charged. Although each cathode described herein is referred to as a "first" electrode 204, multiple cathodes (e.g., thirty or more) may be provided in system 200, which depicts three first electrodes 204 by way of example. Each first electrode 204, being a negatively charged cathode, can be made from titanium or stainless steel, and negatively coupled to power supply 220. Similarly, second electrodes 214 (each separated by respective first electrodes can be a positively charged "anode," thereby causing each corresponding electrolyte bath 212 to be positively charged. Although each anode described herein is referred to as a "second" electrode 214, multiple anodes (e.g., thirty or more) may be provided in system 200, which depicts two second electrodes 214 by way of example. To create a positively charged second electrode 214, titanium with a mixed metal oxide (MMO) coating can be coupled to power supply 220 and used as the anode material. The MMO coating can include iridium oxide, tantalum oxide, and/or ruthenium oxide, among other mixed metal oxides. Iridium oxide or tantalum oxide, when coated onto an anode, can retard degradation from continued use of second electrodes 214 as anodes over time.

The negatively charged bath can cause an edge or surface of workpiece 201 to become positively charged. As a result, any burrs (e.g., burr 20 of FIG. 1) on workpiece 201 can be eroded or etched away. This effect occurs because burrs are small, causing them to have a high current density as electric current passes through workpiece 201. The deburring reaction may be expressed as:

$$Fe \rightarrow Fe^{2+} + 2e^-$$

The negatively charged bath can also coat part of a positively charged or "anodic edge" of workpiece 201 with a zinc phosphate coat. The zinc phosphate coat can be used as a sealer 122 (FIG. 3). The workpiece 201 can be coated according to the following chemical reactions:

$$H_3PO_4 + ZnHPO_4 \rightarrow Zn(H_2PO_4)_2$$

$$H_3PO_4 + Zn_3(PO_4)_2 \rightarrow 3ZnHPO_4$$

In contrast to the deburring provided in a negatively charged bath, the positively charged electrolyte bath can clean the cathodic surface of workpiece 201. The positively charged electrolyte bath can react with the cathodic workpiece 201 to create hydrogen bubbles. Hydrogen bubbles created in this process can scrub an edge or surface of workpiece 201 for cleaning. This reaction can be expressed as:

$$2H^+ + 2e^- \rightarrow H_2$$

The positively charged electrolyte bath can also coat part of a negatively charged or "cathodic edge" of workpiece 201 with a zinc phosphate coat. Similar to the coat provided in a negatively charged bath, the zinc phosphate coat can be used as a sealer 122 (FIG. 3). The workpiece 201 can be coated according to the following chemical reactions:

$$H_3PO_4 + ZnHPO_4 \rightarrow Zn(H_2PO_4)_2$$

$$H_3PO_4 + Zn_3(PO_4)_2 \rightarrow 3ZnHPO_4$$

The result of the first process can include a sealed metal laminate structure 102 (FIG. 3) as described elsewhere herein, including sealer 122 (FIG. 3).

A second process can include phosphate coating and deburring of workpiece 201. One manner in which the second process is chemically distinct from the first process is the absence of zinc. In this case, aqueous electrolyte in each electrolyte bath, 202, 212 can include phosphoric acid among other substances. The pH of electrolyte baths 202, 212, the distance between workpiece 201 and electrodes 204, 214, and the voltage applied by power supply 220 can have the same or similar values as embodiments of the first process.

Similar to other processes described herein, one of first or second electrode 204, 214 can be a negatively charged "cathode." The other of first or second electrode can be a positively charged "anode." These electrodes can allow each electrolyte bath 202, 212 to have opposite polarities. Some acceptable materials for each electrode are discussed elsewhere herein.

The negatively charged electrolyte bath can cause an edge or surface of workpiece 201 to become positively charged. As a result, workpiece 201 can be deburred as it passes through the negatively charged electrolyte bath. This deburring reaction is similar to the deburring in embodiments of the first process and may be expressed as:

$$Fe \rightarrow Fe^{2+} + 2e^-$$

The negatively charged bath can also coat part of a positively charged or "anodic edge" of workpiece 201 with a phosphate seal. The phosphate coat can be used as a sealer 122 (FIG. 3). In an embodiment, phosphate in electrolyte baths 202, 212 reacts with iron in workpiece 201 to convert iron into iron phosphate. Workpiece 201 can be sealed according to the following chemical reaction:

$$H_3PO_4 + Fe \rightarrow FePO_4 + H^+$$

Similar to the first process described, the positively charged electrolyte bath can clean the surface of workpiece 201. The positively charged electrolyte bath may react with negative workpiece 201 to create hydrogen bubbles for cleaning workpiece 201. This reaction can be expressed as:

$$2H^+ + 2e^- \rightarrow H_2$$

The positively charged bath 202, 212 can also react with a negatively charged or "cathodic edge" of workpiece 201 to form a converted iron phosphate coat. Similar to the coat provided in a positively charged electrolyte bath, the phosphate coat can be used as a sealer 122 (FIG. 3). Workpiece 201 can be coated according with sealer 122 (FIG. 3) via the following chemical reaction:

$$H_3PO_4 + Fe \rightarrow FePO_4 + H^+$$

The second process can yield a sealed metal laminate structure 102 (FIG. 3), including sealer 122 (FIG. 3).

A third process can include deburring and cleaning of workpiece 201. One manner in which the third process differs from other processes is that a phosphate coat need not be applied to workpiece 201. Other differences may include adjusting some of the mechanical and electrical properties of system 200.

In embodiments of the third process, the aqueous electrolyte can include sodium chloride or nitrate, among other substances. Aqueous electrolyte in electrolyte baths 202, 212 can be neutral or slightly basic, with a pH value between approximately 11.5 and approximately 6.5. The distance between electrodes 204, 214 and workpiece 201 can be between approximately 0.25 millimeters and approximately 50 millimeters. Power supply 220 can supply a voltage between approximately 10 V and approximately 60 V. In addition, aqueous electrolyte of electrolyte baths 202, 212 can have a flow rate at the edges or surfaces of workpiece 201 between approximately 0.2 meters per second and approximately 10 meters per second.

Similar to the other processes described herein, one of first or second electrode 204, 214 can be a negatively charged "cathode." The other of first or second electrode can be a positively charged "anode." Some materials and configurations used to charge each electrode 204, 214 are discussed elsewhere herein.

The negatively charged electrolyte bath can also cause a portion of workpiece 201 to become positively charged. As a result, workpiece 201 can be deburred as it passes through a negatively charged electrolyte bath. The deburring in embodiments of the third process can be enhanced by a higher anodic current density provided from highly conductive sodium chloride or nitrate. In addition, the flow rate of the aqueous electrolyte described herein also enhances deburring. This process may be expressed chemically as:

$$Fe \rightarrow Fe^{2+} + 2e^-$$

Following removal of burrs, other substances in electrolyte bath 202, 212 can create iron hydroxide. Iron hydroxide is created by reacting the removed iron with hydroxide in electrolyte bath 202, 212. The reaction can be expressed as:

$$Fe^{2+} + 2OH^- \rightarrow Fe(OH)_2$$

Similar to the other processes described herein, positively charged electrolyte bath can clean the surface of workpiece 201. The positively charged electrolyte bath 202, 212 can react with cathodic workpiece 201 to create hydrogen bubbles to clean workpiece 201. This reaction can be expressed as:

$$2H^+ + 2e^- \rightarrow H_2$$

Embodiments of the third process can yield a metal laminate structure 132 (FIG. 4) described elsewhere herein without the presence of burrs or protrusions (e.g., chipping area 122 (FIG. 3)). The third process can also be applied to remove more substantial burrs prior to the first or second process to yield laminate structure 102 (FIG. 3) because the third process has more deburring power.

Each of the processes described herein can be modified without substantially changing the result. For example, each successive electrode 204, 214 need not alternate between cathode and anode. Other embodiments in which multiple cathode and anode electrodes 204, 214 are provided in a row are contemplated. Further, the distance between workpiece 201 and electrodes 204, 214 can be modified as desired.

The processes described herein are not mutually exclusive options. For example, a workpiece 201 may be deburred and sealed according to an embodiment of one of the first or second processes described above, and then cleaned and/or deburred even more according to an embodiment of the third process. Alternatively, workpiece 201 can be deburred according to an embodiment of the third process and later coated and sealed according to an embodiment of the first or second process. In each embodiment, workpiece 201 can be precoated with, for example, an electrically insulative coating (e.g., C-6) before undergoing any of the treatments described herein. Workpiece 201 can also be dried and cleaned outside of electrolyte baths 202, 212, either between treatments or once all treatments are complete. Drying and cleaning workpiece 201 can avoid contamination between various electrolyte baths 202, 212.

As shown in FIG. 5, workpiece 201 can be directed through several electrolyte baths 202, 212 along the direction of arrow A. Workpiece 201 can also pass through passages 232 as it travels through each electrolyte bath 202, 212. The directing of workpiece 201 can be accomplished through several implementations.

Figure 6:
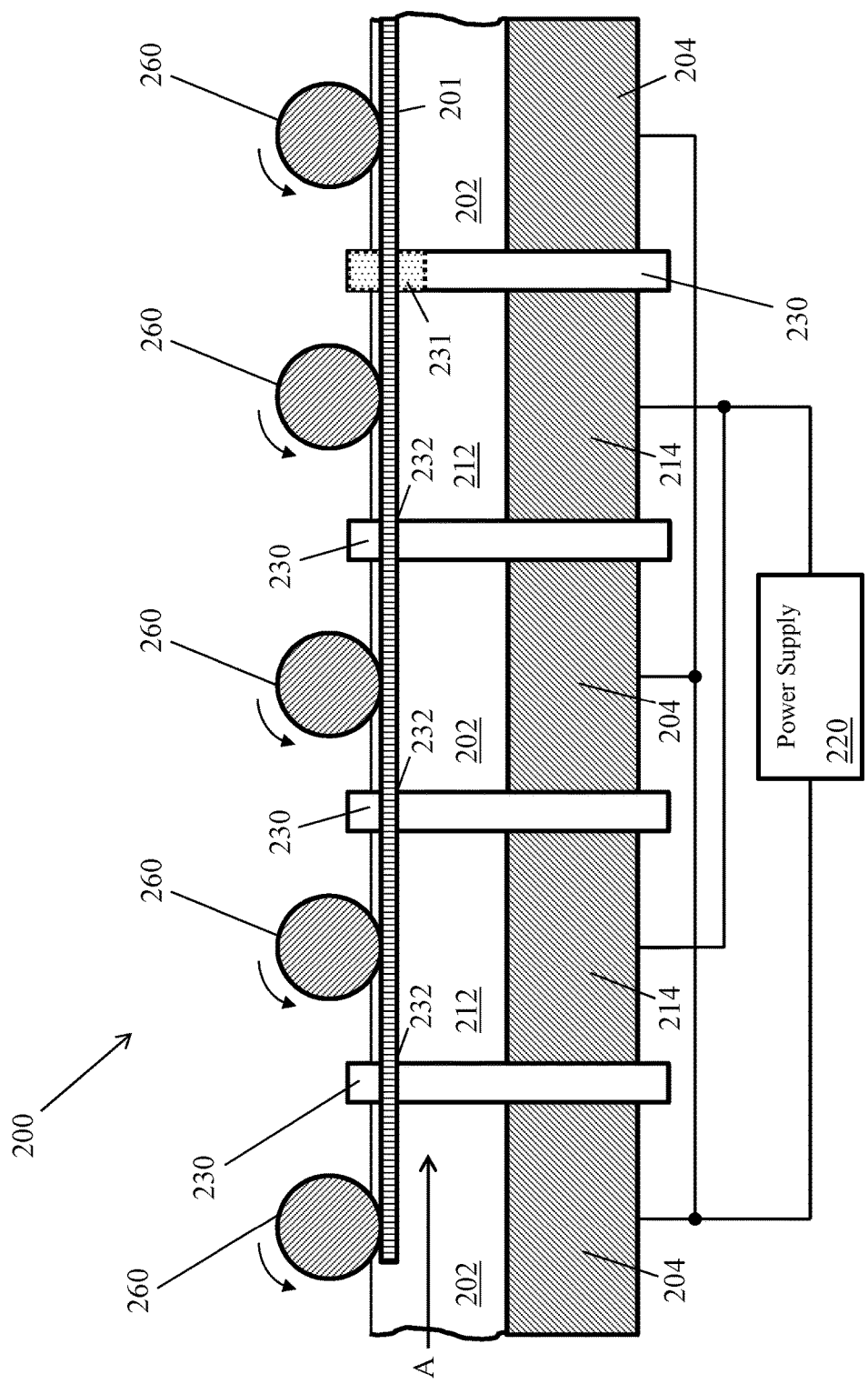
FIG. 6 shows a cross-sectional view of another system for treating a workpiece according to an embodiment of the disclosure.

Turning to FIG. 6, an embodiment of system 200 with magnetic rollers 260 is shown. Magnetic rollers 260 can be a driving mechanism for directing workpiece 201 through electrolyte baths 202, 212. Each magnetic roller 260 can be driven by motors, gears, or other mechanisms (not shown) capable of imparting rotational motion. Magnetic rollers 260 can be rotatable in a clockwise or counterclockwise direction to move workpiece 201 along the direction of arrow A. Each magnetic roller 260 can optionally be coated or sleeved in a polymer material to resist corrosion from electrolyte baths 202, 212.

In an embodiment of system 200, one magnetic roller 260 can be positioned above first electrolyte bath 202, and a second magnetic roller 260 can be positioned above second electrolyte bath 212. Additional magnetic rollers 260 can also be included. Magnetic rollers 260 can be magnetically polarized. As a result, each magnetic roller 260 can magnetically attract workpiece 201, which is tangentially in contact with one or more magnetic rollers 260 at their surfaces.

Through magnetic rollers 260, workpiece 201 can be substantially aligned with passage 232. As used herein, the term "substantial alignment" or "substantially aligned" can include any alignment between workpiece 201 and passage 232 that allows workpiece 201 to enter passage 232. Workpiece 201 can therefore travel through passages 232 to contact aqueous electrolytes in electrolyte baths 202, 212. Passages 232 can be in the form of spring loaded tips, elastic curtains, and/or pinch rollers to prevent electrical shorts between electrolyte baths 202, 212. In this manner, workpiece 201 can undergo any of the processes for electrolytic deburring, coating, and/or sealing described elsewhere herein.

Figure 7:
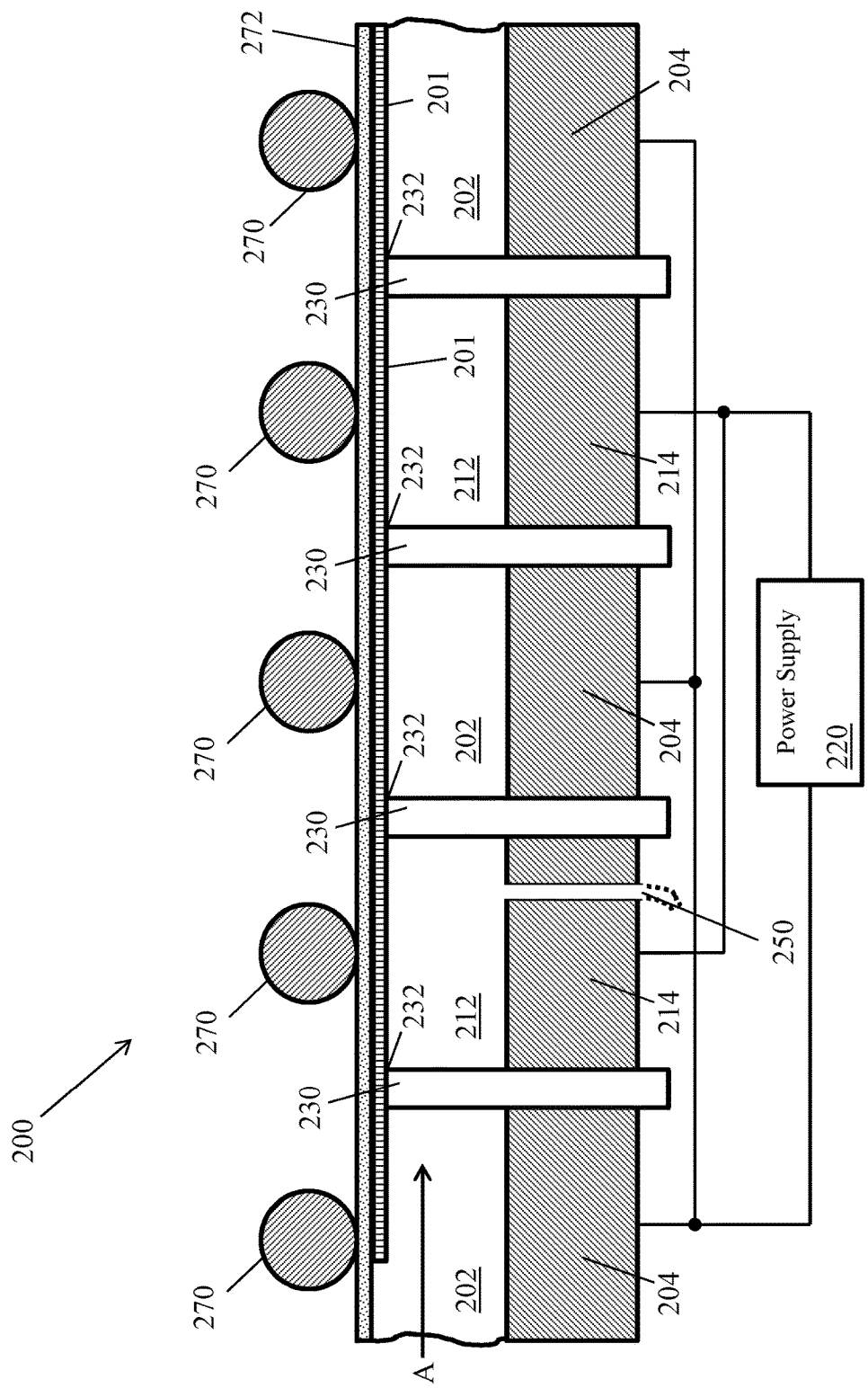
FIG. 7 shows a cross-sectional view of a further system for treating a workpiece according to an embodiment of the disclosure.

In another embodiment shown in FIG. 7, system 200 can include several magnets 270 and a belt 272. Magnets 270 can attract workpiece 201 to the surface of belt 272. A driving force imparted by mechanisms such as motors or gears (not shown) can move magnets 270 and/or belt 272. In an embodiment, magnets 270, belt 272, and workpiece 201 move together along arrow A. In a different embodiment, magnets 270 can travel across the upper surface of belt 270 to guide workpiece 201 while belt 272 remains stationary. Movement of magnets 270 in the second scenario can avoid potentially unreliable forms of belt motion such as turns and bends.

In an embodiment of system 200, belt 272 may be coupled to barrier seals 230 and located above electrolyte baths 202, 212. A plurality of magnets 270 can be in physical contact with belt 272. Magnets 270 can magnetically attract workpiece 201. As a result, each workpiece 201 can be in physical contact with a surface of belt 272.

Through magnets 270, workpiece 201 can be substantially aligned with passage 232. Workpiece 201 can therefore travel through passages 232 to contact aqueous electrolytes in electrolyte baths 202, 212. Passages 232 can be in the form of air gap 231, spring loaded tips, elastic curtains, and/or pinch rollers. Passages 232 can allow workpiece 201 to cross barrier seals 230 while preventing electrical shorts between electrolyte baths 202, 212. In this manner, workpiece 201 can undergo any of the processes for electrolytic deburring, edge coating, and/or cleaning described elsewhere herein.

Figure 8:
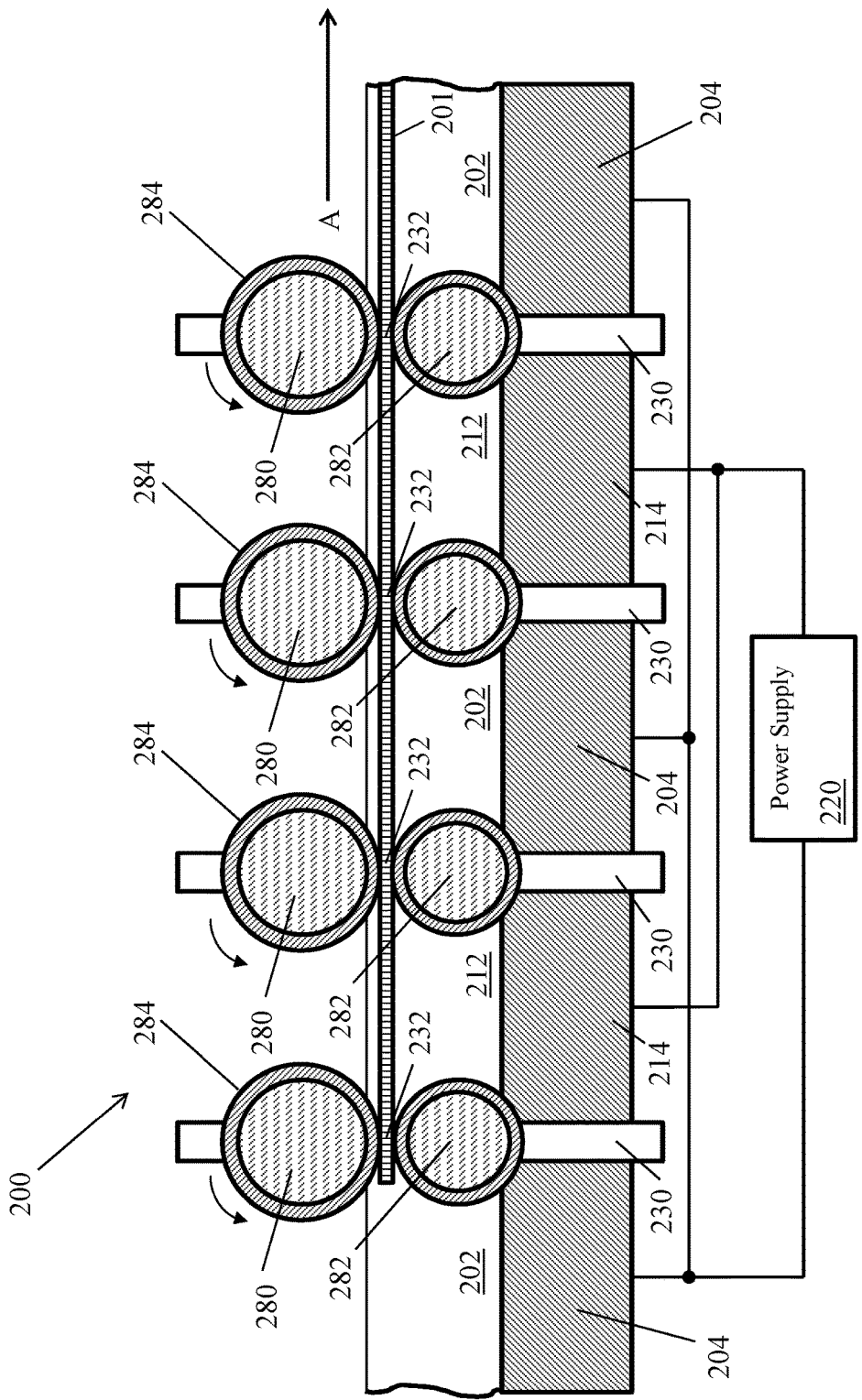
FIG. 8 shows a cross-sectional view of yet another system for treating a workpiece according to an embodiment of the disclosure.

Turning to FIG. 8, yet another embodiment of system 200 is shown. System 200 can include a first mechanical roller 280 and corresponding second mechanical roller 282. As shown in FIG. 8, several first mechanical rollers 280 and several second mechanical rollers 202 can also be included. In some embodiments, first and second mechanical rollers 280, 282 can be non-magnetic.

A driving force can be imparted to first mechanical roller 280 and/or second mechanical roller 282 through motors, gears, or other mechanisms for imparting a force. A driving force can allow first roller 280 and/or second roller 282 to rotate in a clockwise or counterclockwise direction. In some embodiments, a driving force can be imparted to only one of first mechanical roller 280 or second mechanical roller 282. As a result, the other of first or second mechanical roller 280, 282 can be a "passive pinch roller," which can move in response to being contacted by workpiece 201 or the other mechanical roller 280, 282.

In an embodiment, first mechanical roller 280 can be coupled to barrier seal 230 and positioned above passage 232. Second mechanical roller 282 can also be coupled to barrier seal 230 and positioned below passage 232. In this manner, each mechanical roller 280, 282 are configured to receive and direct workpiece 201 through passage 232. In some embodiments, first mechanical roller 280 can be larger than second mechanical roller 282, as shown in FIG. 8. An advantage that can be obtained from sizing first mechanical roller 280 differently from second mechanical roller 282 is that the effective width of the space between the two neighboring mechanical rollers 282 can be decreased.

Barrier seal 230 and passage 232 can function similarly to other embodiments of system 200 described herein to prevent electrical shorts between electrolyte baths 202, 212. In an embodiment, elastic sealers 284 can be coupled to first mechanical roller 280 and/or second mechanical roller 282. Elastic sealers 284 can electrically insulate electrolyte baths 202, 212 from each other as workpiece 201 passes through system 200. Elastic sealers 284 can provide electrical insulation, for example, by being made from an electrically insulative elastic material designed to accept the geometry of workpiece 201 traveling through passage 232.

Figure 9:
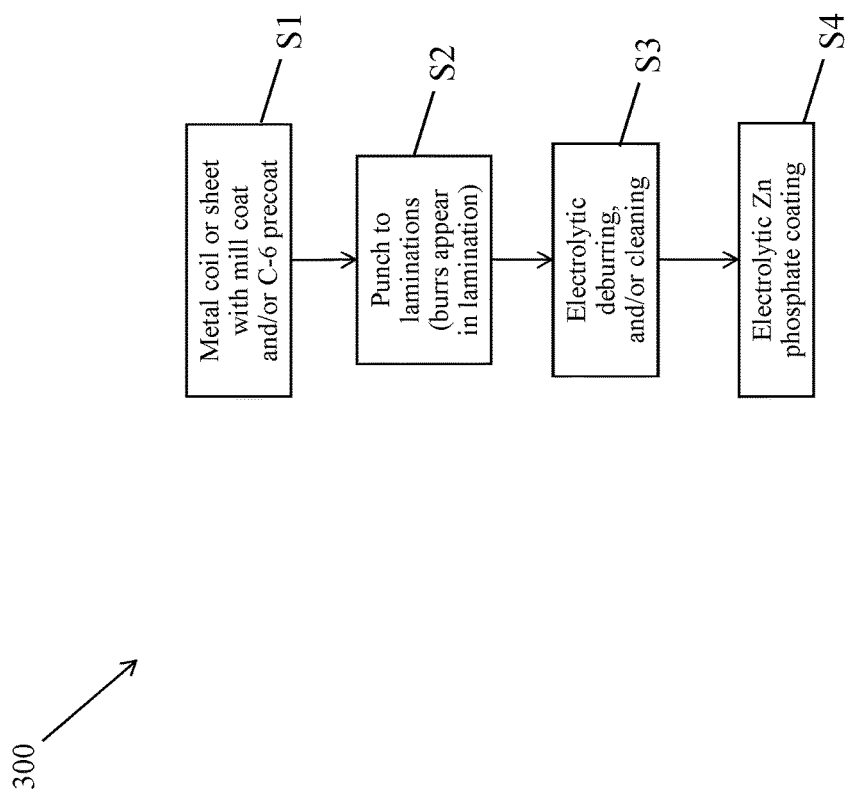
FIG. 9 is an example flow diagram of a method for treating a workpiece according to an embodiment of the disclosure.

Various methods for treating laminations to provide improved structures from workpiece 201 (FIGS. 5-8), such as sealed metal laminate structure 102 (FIG. 3) and metal laminate structure 132 (FIG. 4) are also disclosed. Turning to FIG. 9, an example flow diagram of a method 300 for preventing burring and damage in a workpiece 201 (FIGS. 5-8) is shown. Method 300 is one of several proposed methods by which workpiece 201 (FIGS. 5-8) can be treated.

A user of method 300 can begin with a metal sheet or coil in step S1. The metal coil or sheet can include mill coatings 116, 118 (FIGS. 3, 4). In addition, workpiece 201 can have an enamel layers 120A, 120B (FIGS. 3, 4) laminated to its surface. Enamel layers 120A, 120B can be an insulative coating for electrical steel applied through any currently known or later developed process. Enamel layer 120A, 120B (FIGS. 3, 4) may be composed of an organic coating such as C-6, as discussed elsewhere herein.

A user of method 300 can punch workpiece 201 (FIGS. 5-8) from a metal coil or sheet in step S2 to form laminations. In some instances, precoated enamel layers 120A, 120B (FIGS. 3, 4) can prevent burring of workpiece 201 (FIGS. 5-8) during punching. In other embodiments of method 300, burr formation in workpiece 201 (FIGS. 5-8) can occur despite the presence of enamel layers 120A, 120B (FIGS. 3, 4). The extent to which burrs 20 (FIG. 1) may appear can depend, for example, upon the quality of a punching die used to punch laminations from a metal sheet or coil. If a punching die is sharpened, fewer burrs 20 (FIG. 1) may appear. However, the lifespan of a punching die may decrease due to frequent sharpening. If a punching die is not sharpened, a greater number of burrs 20 (FIG. 1) may appear following step S2.

In step S3 of process 300, burrs can be electrolytically removed from workpiece 201 (FIGS. 5-8). As discussed elsewhere herein, deburring can occur in an embodiment of system 200 (FIGS. 5-8) with two or more electrolyte baths 202, 212 (FIGS. 5-8) of opposite polarity. Each electrolyte bath 202, 212 (FIGS. 5-8) can be in contact with two or more corresponding electrodes 204, 214 (FIGS. 5-8), with barrier seals 230 (FIGS. 5-8) between each electrolyte bath. An example of a chemical process for deburring workpiece 201 (FIGS. 5-8) in an electrolyte bath 202, 212 (FIGS. 5-8) is discussed elsewhere herein. To pass workpiece 201 through electrolyte baths 202, 212 (FIGS. 5-8) in step S3, workpiece 201 can be magnetically coupled to a component such as a magnet, roller, or belt. In addition or alternatively, mechanical rollers may physically contact and propel workpiece 201. In embodiments of process 300, surfaces of workpiece 201 (FIGS. 5-8) are coated with one or more precoated enamel layers 120A, 120B (FIGS. 3, 4) before entering electrolyte baths 202, 212 (FIGS. 5-8).

A user of method 300 can electrolytically deposit sealer 128 (FIG. 3) onto workpiece 201. The depositing of sealer 128 (FIG. 3) can occur in the same system as was used to deburr and/or clean workpiece 201 (FIGS. 5-8) in step S3. Sealer 128 (FIG. 3) can be deposited in each of a positively charged electrolyte bath and negatively charged electrolyte bath, or in one group of similarly charged electrolyte baths. The chemical process by which sealer 128 (FIG. 3) is deposited onto workpiece 201 (FIGS. 5-8) is discussed elsewhere herein. In step S4, sealer 128 (FIG. 3) adheres to chipping area 122. A sealed lamination structure 102 (FIG. 3) can be yielded from step S4 in combination with the other steps of method 300.

Figure 10:
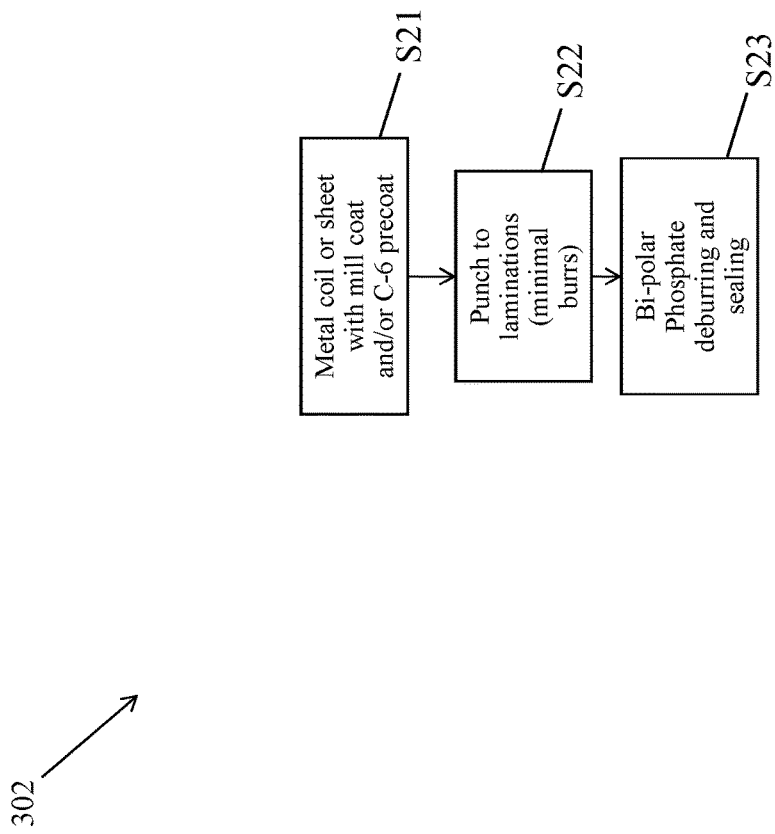
FIG. 10 is an example flow diagram of another method for treating a workpiece according to an embodiment of the disclosure.

Turning to FIG. 10, an example flow diagram of a further method 302 for deburring a workpiece is shown. Similar to method 300, process 302 can begin with a user obtaining a workpiece 201 (FIGS. 5-8) in the form of a metal sheet or coil in step S21. The metal sheet or coil can include mill coatings 116, 118 (FIGS. 3, 4). In addition, workpiece 201 can have enamel layers 120A, 120B (FIGS. 3, 4) laminated to its surface. As described elsewhere herein, enamel layers 120A, 120B can be an insulative coating for electrical steel. Enamel layers 120A, 120B (FIGS. 3, 4) may be composed of an organic coating such as C-6, as discussed elsewhere herein.

A user can punch workpiece 201 (FIGS. 5-8) from a metal coil or sheet in step S22 to form laminations. In embodiments of method 302, enamel layers 120A, 120B can protect metal layer 110 (FIGS. 3, 4) from damage, resulting in little to no burrs 20 (FIG. 1) forming after punching. The number of burrs 20 (FIG. 1) can be minimized by punching with a sharpened punching die or increasing the number of enamel layers 120A, 120B. A user of method 302 has discretion in step S22 to reduce burr formation as much or as little as may be desired, based on quality tolerances. Thus, punching in step S22 can include conventional punching in some embodiments. In addition, chipping areas 122 (FIG. 3) may be present after punching workpiece 201 (FIGS. 5-8) in step S22.

Workpiece 201 can be sealed and deburred via electrolytic phosphate baths in step S23. Here, method 302 can differ from method 300 by electrolytically deburring and sealing workpiece 201 (FIGS. 5-8) in a single group of electrolyte baths 202, 212 (FIGS. 5-8). Each electrolyte bath can include the same electrolyte, with different baths having opposite polarities. To pass workpiece 201 through electrolyte baths 202, 212 (FIGS. 5-8) in step S3, workpiece 201 can be magnetically coupled to a component such as a magnet, a roller, or a belt. In addition or alternatively, mechanical rollers may physically contact and propel workpiece 201. Examples of alternating electrolyte baths 202, 212 (FIGS. 5-8) capable of both deburring and sealing workpiece 201 are discussed in further detail elsewhere herein. An example of electrolytic compounds usable in step S23 of method 302 can include phosphoric acids, which can allow deburring and/or phosphate coating reactions to occur based on polarity. Step S23 of method 302 can yield a sealed lamination structure 102 (FIG. 3) with phosphate sealers 128 (FIG. 3) deposited onto chipping areas 122 (FIG. 3), and without burrs on sealed lamination structure 102 (FIG. 3).

Figure 11:
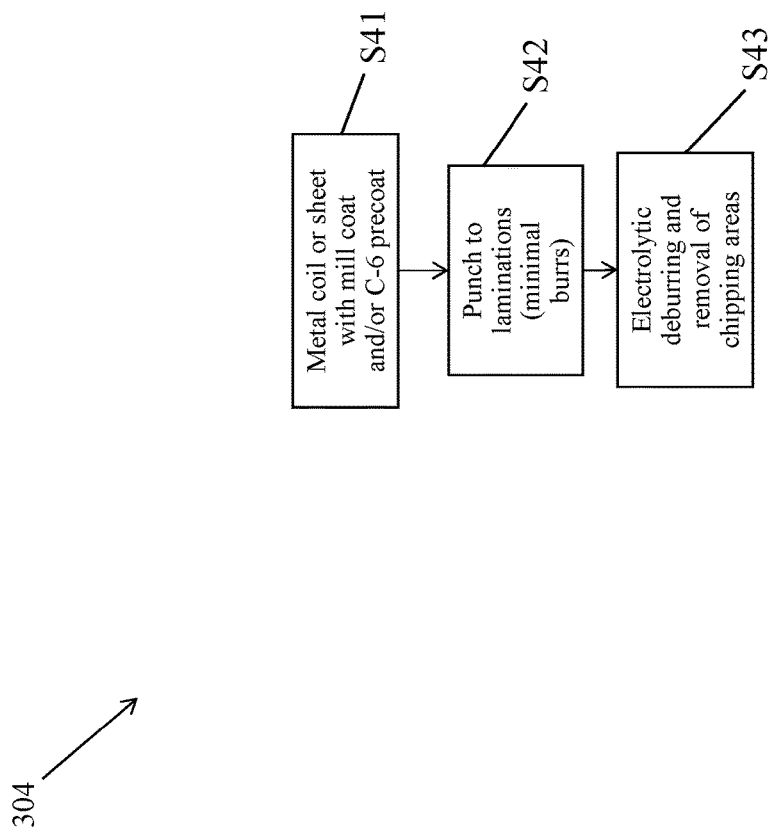
FIG. 11 is an example flow diagram of an additional method for electrolytically deburring a workpiece according to an embodiment of the disclosure.

The example flow diagram of FIG. 11 illustrates an embodiment of an additional method 304 for deburring workpiece 201 (FIGS. 5-8). Process 304 may differ from other embodiments by removing chipping area 122 (FIG. 3) to avoid the application of sealers 128 (FIG. 3). As with methods 300, 302, process 304 can begin with a user obtaining a workpiece 201 (FIGS. 5-8) in the form of a metal sheet or coil in step S41. The metal sheet or coil can include mill coatings 116, 118 (FIGS. 3, 4) and enamel layers 120A, 120B (FIGS. 3, 4) laminated to its surface. As discussed elsewhere herein, enamel layers 120A, 120B can be an electrically insulative coating such as C-6. Following step S41, a user can punch workpiece 201 in step S42, using enamel layers 120A, 120B and a sharpened punching die, if desired, to reduce the number of burrs 20 (FIG. 1).

In step S43, a user can remove both chipping areas 122 (FIG. 3) and burrs 20 (FIG. 1) using a single group of electrolyte baths. Each electrolyte bath can include the same electrolyte, with different baths having opposite polarities. Examples of systems for achieving this effect are discussed elsewhere herein, and can include two or more electrolyte baths 202,212 (FIGS. 5-8) containing hydroxide ions. To pass workpiece 201 through electrolyte baths 202,212 (FIGS. 5-8) in step S3, workpiece 201 can be magnetically coupled to a component such as a magnet, a roller, or a belt. In addition or alternatively, mechanical rollers may physically contact and propel workpiece 201. Hydroxide ions in electrolyte baths 202,212 (FIGS. 5-8), can react with iron on the surface of workpiece 201 (FIGS. 5-8) to remove any remaining burrs or chipping areas from workpiece 201. An embodiment of process 304 can yield a metal laminate structure 132 (FIG. 4) without burrs or chipping areas.

The various embodiments discussed in the present disclosure can offer several technical and commercial advantages. As one example, embodiments of the present invention reduce or eliminate contamination which sometimes results from conventional processes, such as punching and sanding. Further, various embodiments can avoid any loss or damage to mill coatings of a metal lamination. In addition, laminated metal structures according to the present disclosure may include a uniform surface coating without imperfections such as burrs and chipping areas. In circumstances where a chipping area is present on a laminated metal structure, embodiments of the present invention may seal exposed portions of steel or metal to avoid further damage.

Economically, embodiments of the present disclosure offer a way to avoid costly steps, such as recoating. By precoating a lamination and electrolytically removing burrs and/or chipping areas, steps such as sanding and grinding can be avoided altogether. These advantages provide substantial reduction of investment, material, and labor costs associated with building a generator or stator core.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for treating a workpiece, the system comprising:
   a first electrolyte bath having a first electrode thereon, the first electrode being a negatively charged cathode, wherein the first electrolyte bath being negatively charged induces a deburring reaction with a first portion of the workpiece therein;
   a second electrolyte bath having a second electrode thereon, the second electrode being a positively charged anode, wherein the second electrolyte bath being positively charged induces a cleaning reaction with a second portion of the workpiece therein, wherein the cleaning reaction includes causing the second portion of the workpiece to react with the composition of the second electrolyte bath to form hydrogen bubbles, wherein the first electrolyte bath and the second electrolyte bath have an identical electrolyte, and wherein the identical electrolyte is configured to form a zinc phosphate coat on positively charged and negatively charged edges of the workpiece;
   a power supply coupled to the first electrode and the second electrode; and
   a barrier seal dividing the first electrolyte bath from the second electrolyte bath, wherein the barrier seal comprises a passage configured to:
   allow the workpiece to move from one of the first electrolyte bath and the second electrolyte bath to the other electrolyte bath, while preventing electrical shorting between each one of the first electrolyte bath and the second electrolyte bath.

2. The system of claim 1, wherein the passage further comprises one of an air gap, a spring loaded tip, an elastic curtain, an elastic contact seal, and a passive pinch roller.

3. The system of claim 1, wherein one of the first electrolyte bath and the second electrolyte bath includes one of sodium chloride and nitrate.

4. The system of claim 1, wherein the first electrolyte bath and the second electrolyte bath each include a same aqueous electrolyte.

5. The system of claim 1, wherein at least one of the first and second electrode comprises one of tantalum oxide and iridium oxide.

6. The system of claim 1, further comprising a cover plate coupled to the barrier seal and located above one of the first electrolyte bath and the second electrolyte bath.

7. The system of claim 1, further comprising a first magnetic roller positioned above the first electrolyte bath and a second magnetic roller positioned above the second electrolyte bath, wherein each of the first and second magnetic rollers magnetically contact the workpiece and substantially align the workpiece with the passage.

8. The system of claim 1, further comprising:
   a belt coupled to the barrier seal and located above the first and second electrolyte baths; and
   a plurality of magnets in physical contact with the belt, wherein the plurality of magnets magnetically attract the workpiece to the belt and substantially align the workpiece with the passage.

9. The system of claim 1, further comprising:
   a first roller coupled to the barrier seal and positioned adjacent to a first side of the passage; and
   a second roller coupled to the barrier seal and positioned adjacent to a second side of the passage;
   wherein the first roller and the second roller are configured to receive the workpiece and move the workpiece through the passage.

10. The system of claim 9, wherein the first roller is larger than the second roller.

11. The system of claim 9, further comprising an elastic seal coupled to at least one of the first roller and the second roller.

12. The system of claim 1, further comprising an electrolyte transmission aperture extending through one of the first electrode and the second electrode.

13. A system for treating a workpiece, the system comprising:
   a plurality of first electrolyte baths each having a first electrode thereon, the first electrode being a negatively charged cathode, wherein each of the plurality of first electrolyte baths being negatively charged induces a deburring reaction with a respective portion of the workpiece therein;
   a plurality of second electrolyte baths each positioned alternatingly between a respective pair of the plurality of first electrolyte baths, and having a second electrode thereon, the second electrode being a positively charged anode, wherein each of the plurality of second electrolyte baths being positively charged induces a cleaning reaction with a respective portion of the workpiece therein, wherein the cleaning reaction includes causing the second portion of the workpiece to react with the composition of the second electrolyte bath to form hydrogen bubbles, wherein each of the plurality of first electrolyte bath and each of the plurality of second electrolyte bath includes an identical electrolyte, and wherein the identical electrolyte is configured to form a zinc phosphate coat on positively charged and negatively charged edges of the workpiece therein;

a power supply coupled to each of the plurality of first electrode and each of the plurality of second electrode; and a plurality of barrier seals dividing each of the plurality of first electrolyte bath from an adjacent second electrolyte bath of the plurality of second electrolyte baths, wherein each barrier seal comprises a passage configured to:

allow the workpiece to move from one of the plurality of first electrolyte baths to one of the plurality of second electrolyte baths, while preventing electrical shorting between the adjacent first electrolyte bath and second electrolyte bath.

14. The system of claim 13, wherein each passage further comprises one a spring loaded tip or a passive pinch roller.

15. The system of claim 13, wherein the identical electrode comprises phosphoric acid.

16. The system of claim 13, wherein each of the first and second electrode comprises tantalum oxide.

17. The system of claim 13, further comprising a cover plate coupled to one of the plurality of barrier seals, and located above a respective one of the plurality of first electrolyte baths or one of the plurality of second electrolyte baths.

18. The system of claim 13, further comprising a plurality of magnetic rollers each positioned above one of the plurality of first electrolyte baths or one of the plurality of second electrolyte baths, each magnetic roller being configured to magnetically contact the workpiece and substantially align the workpiece with the passage.

19. The system of claim 13, wherein the workpiece comprises a freestanding iron lamination.

* * * * *